Jan. 1, 1924

E. J. QUINN

CLUTCH

Filed June 17, 1918

Inventor
E. J. Quinn
By Attorney
Geo. B. Kennedy

Jan. 1, 1924

E. J. QUINN

CLUTCH

Filed June 17, 1918

Inventor
E. J. Quinn
By Attorney
Geo. H. Kennedy Jr.

Patented Jan. 1, 1924.

1,479,732

UNITED STATES PATENT OFFICE.

EDWARD J. QUINN, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

CLUTCH.

Application filed June 17, 1918. Serial No. 240,440.

*To all whom it may concern:*

Be it known that I, EDWARD J. QUINN, a citizen of the United States, residing at Worcester, in the county of Worcester and Commonwealth of Massachusetts, have invented a new and useful Improvement in a Clutch, of which the following, taken in connection with the accompanying drawings, is a specification.

The present invention relates to clutching mechanism, and more particularly to such mechanism wherein the clutching elements are intermittently thrown into engagement to effect a predetermined angular movement of a driven member from a constantly rotating driving member.

In certain classes of heavy and massive machinery for the transmission of considerable power, the movement of such clutching elements into and out of engagement with the necessary rapidity is almost impossible of accomplishment by hand, due to the weight and inertia of the parts. Moreover, when, as is often the case, the driven member is to be rotated only through a single revolution, or part of a revolution, the difficulties of hand operation are increased, since it becomes extremely difficult for an operator, especially when the parts to be moved are massive, to effect their movements at the proper time.

Various attempts have been made to obviate the difficulties of operation of clutches of this class, with the end in view of procuring the movement of the clutching elements into and out of operative engagement by power which is furnished by the rotating elements themselves, from the source of power whose transmission by the clutch is desired. Such a clutch, with the operating mechanism therefor, is shown and described in the United States Letters Patent to Fuller, No. 1,193,008, granted August 1, 1916. The present invention contemplates certain improvements in the type of clutch shown in said Fuller patent, more particularly as applied to the operation of a metal cutting shear, whereby the clutch members and the operating devices therefor are rendered easily accessible, and readily removable without disturbing or tearing down the other parts of the shear or other device to which the clutch is applied.

The present invention also contemplates certain refinements of construction in the operating mechanism of a clutch of this class, whereby to improve the action of the clutch operating mechanism, shown and described in the Carroll Patent No. 1,383,525, dated July 5, 1921. Other and further objects of the invention will become apparent as the description thereof proceeds, the invention residing in the combination and arrangement of the several elements as set forth more particularly hereinafter, reference being had to the accompanying drawings, in which—

Figure 3 is a fragmentary view of the clutching devices, with certain parts removed, to disclose more clearly the construction of other parts.

Similar reference characters refer to similar parts in the different figures.

Figure 1:
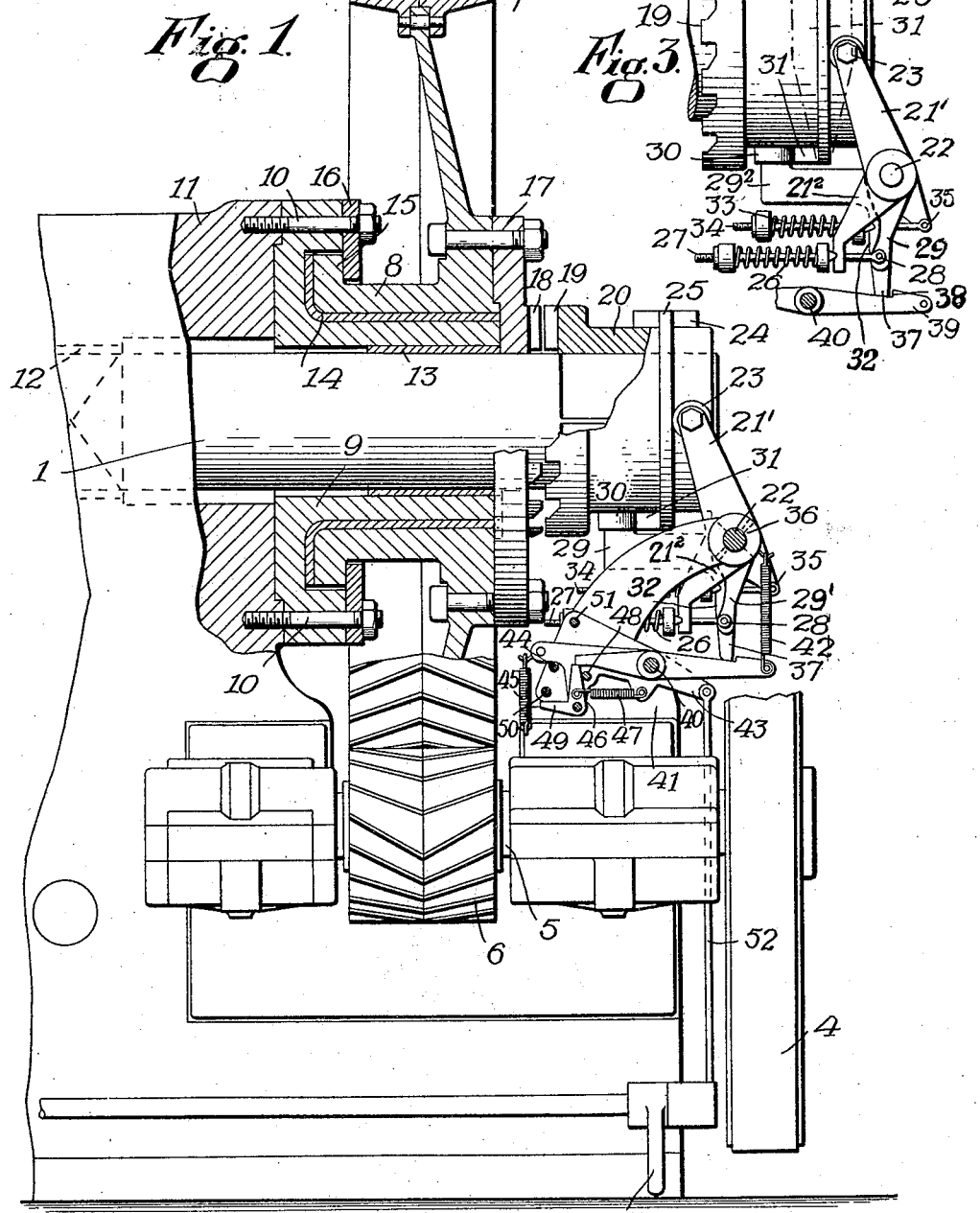
Figure 1 is a side view, partly in vertical section, of my improved clutch and the operating mechanism therefor.

As shown in the drawings, the clutch of my invention is applicable to the intermittent rotation of a shaft 1, which may be employed, for example, to operate a metal cutting shear, or the like, not shown, it being the function of the clutch to impart, at intervals, a predetermined rotation to said shaft, for the purpose of procuring a single operation of the shear or other device, and then to disconnect said shaft from the driving power, until another operation is desired. The power required for rotating the shaft 1 may be supplied, continuously, from any suitable source, such as a motor 2, having a belt drive 3 to a pulley 4. The pulley 4 is secured to a continuously rotating driving shaft 5 which carries a pinion 6 in constant mesh with a gear 7.

The gear 7 provides a central hub 8, by means of which said gear is journalled on a stationary quill 9, the latter being secured by bolts 10, 10, to the fixed framework 11 of the machine. Said framework 11 provides a bearing 12 for the shaft 1, and the other bearing for said shaft is provided by the bore of the quill 9, preferably by an antifriction bushing 13 interposed between said quill and the shaft 1. The quill 9 being rigid with the framework 11, it will thus be seen that ample bearing surface is provided for the shaft 1, and further that there is no substantial overhang of said shaft beyond its bearings. Furthermore, the weight of the gear 7 is supported entirely by the quill 9; therefore said gear produces no bending strains on the shaft 1, either by its weight or by the pressure on its teeth when power is being transmitted thereby. The hub 8 of the gear which preferably turns on an antifriction bushing 14, is shown as provided at one end with a flange 15 fitting into a corresponding recess of the quill 9. An annular plate 16, secured to the quill by the retaining bolts 10, has a portion thereof overlapping the flange 15, so as to prevent longitudinal movement of the gear 7 on said quill.

The constantly rotating gear 7 has secured thereto on its outer side a clutching member 17, providing a series of clutch teeth 18 which are adapted for cooperation with a similar series of clutch teeth 19 on a sliding collar 20. The collar 20 is slidable on the projecting end of shaft 1, which is made square to prevent relative rotation, and said collar normally occupies the position shown in Figure 1, with its clutch teeth 19 out of engagement with the clutch teeth 18 of gear 7, when the shaft 1 is not being operated. When the collar 20 is moved to the left, Fig. 1, the clutch teeth 18 and 19 are engaged, resulting in the rotation of the shaft 1 from the continuously rotating gear 7.

The mechanism for controlling the movement of the collar 20, to engage and disengage the clutch, is similar to that set forth and described in the aforesaid copending application of Carroll. A lever 21, pivoted at 22 to the fixed framework, carries at the end of one of its arms 21' a cam roll 23, which cooperates with a face cam 24 on the side of an annular flange 25 of the collar 20. The other arm 21² of the lever 21 projects downwardly and is operated upon by a compression spring 26, which surrounds a rod or bar 27 that is pivoted at 28 to an arm 29' of a second lever 29. This second lever 29 is also pivoted to the fixed framework on the axis 22 and has an upper arm 29² which carries a cam roll 30, adapted to cooperate with a face cam 31 on the opposite side of the flange 25 from the face cam 24. Another arm 32 of this second lever behind the arm 29', as shown in Fig. 1, projects downwardly and is acted upon by a compression spring 33, which surrounds a rod or bar 34 that is pivoted at 35 to the fixed framework.

In the construction of the copending application of Carroll, a single lever is used in place of the two levers above referred to, said single lever having a pair of arms each carrying cam rolls for cooperation with the two face cams of the sliding collar, and also a third arm which is acted upon by a compression spring corresponding to the spring 33 above referred to, and adapted to rock the lever in the act of engaging the clutch.

In this construction of Carroll there is an unavoidable lapse in the operation of the single lever, due to the fact that the horizontally disposed cam roll, corresponding to the roll 30 of the present application, must move away from engagement with its cooperating face cam before the vertically disposed cam roll, corresponding to the roll 23 of the present application, can be brought up against its cooperating face cam. There is therefore an unavoidable clearance in the Carroll construction before the vertically disposed cam roll begins to act, resulting in a certain shock on the entire mechanism, due to the forcible contact of said roll with its cooperating face cam.

Figure 2:
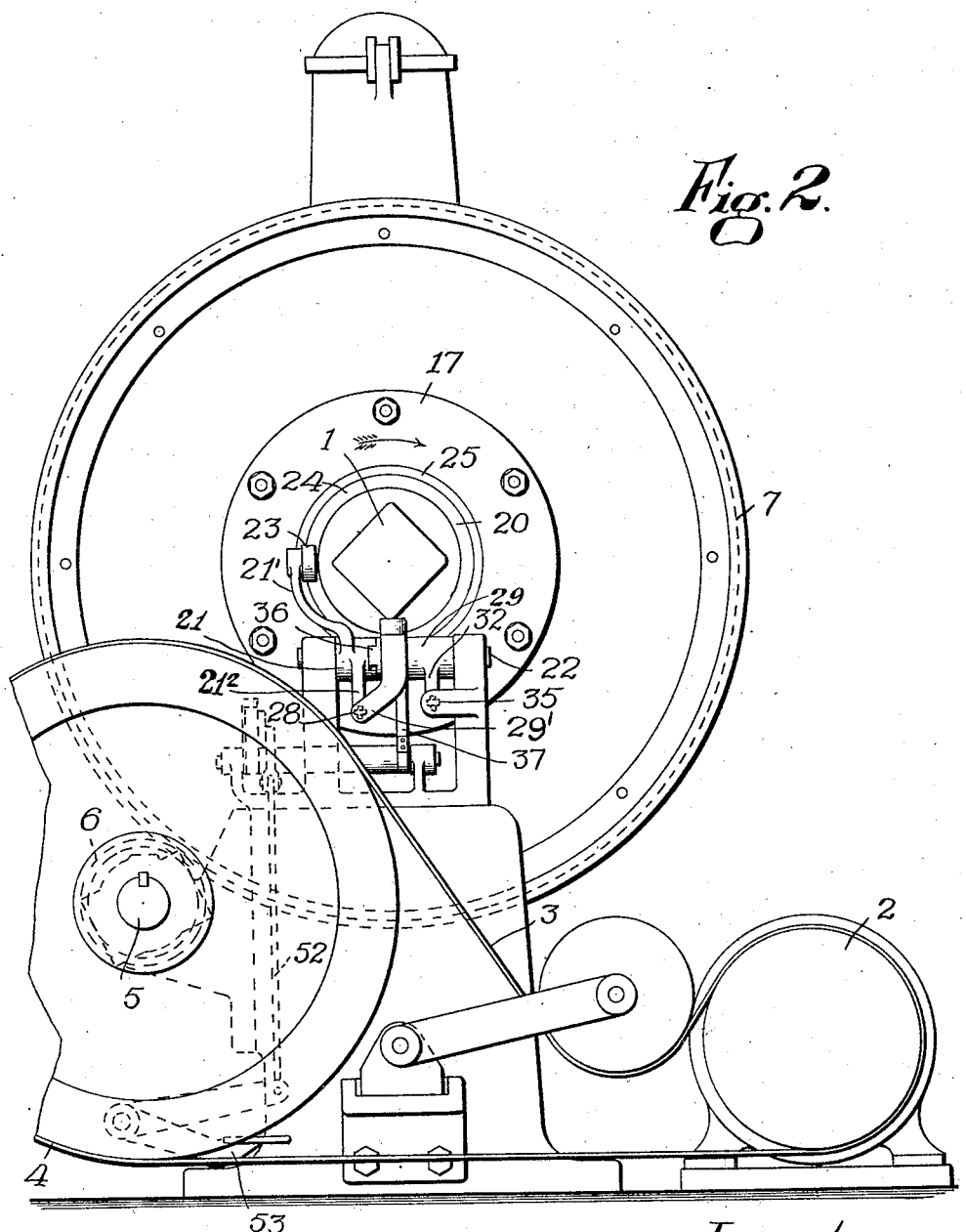
Figure 2 is an end view of the parts shown in Fig. 1.

In the present construction this heavy blow which would otherwise be caused by the release of the spring 33, is obviated by using two levers in place of a single lever of Carroll. The two levers, movable about the same pivotal axis 22, have cooperating clutch teeth 36, 36, as shown in Fig. 2, and are normally held in engagement by the spring 26. When the cam roll 23 is clear of its cooperating face cam 24, the clutch being held in inoperative position by the cooperation of cam roll 30 with face cam 31, the lever 21 is pushed by the spring 26 to carry said roll 23 up close to the flange 25. This action is permitted by the formation of the clutch teeth 36, 36, which allow a predetermined amount of lost motion between the two levers. When the spring 33 is released, as hereinafter described, the roll 23 is already, without further movement, in position to cooperate with its face cam 24, and the movement of cam roll 30 away from its face cam 31 simply compresses the spring 26, without affecting the position of roll 23, the motion being taken up by the clearance provided in the teeth 36, 36.

For actuating the levers, and for controlling the operation of the spring 33, a mechanism similar to that described in the Carroll application may be employed. To this end, a depending extension 37 of the second lever is adapted to cooperate with a shoulder 38 on a lever 39, which is pivoted at 40 in a stationary support 41. This lever 39 is normally held in the position shown by means of a spring 42, with the extension 37 in engagement with shoulder 38, to lock the second lever against movement by the compressed spring 33. Also pivoted at 40 is a rocking lever 43, which is normally held pressed against a stationary stop 44 by means of a light spring 45. Said lever 43 has pivoted at one end thereof, a latch 46, which is held yieldingly by a spring 47 against a stop 48 (one lever 43), with one end of said latch disposed below the adjacent end of lever 39, as shown in Fig. 1. The pivoted latch 46 has integral therewith a trip arm 49, in the path of which is disposed a stationary stop or abutment 50. The pivoted lever 43 is adapted to be oscillated for the purpose of inaugurating the automatic operation of the above described mechanism, being movable, for this purpose, through a small arc between the fixed stop 44 which engages its lower edge, and a fixed stop 51 which engages its upper edge. To this end a link 52 may be attached to said lever 43, with its other end connected to a foot treadle 53, or the like, in any position convenient to the operator, who may be stationed at some distance from the clutch. Or, if desired, a solenoid may be employed to move the lever 43, since only the light spring 45 is to be overcome. This action, requiring no appreciable draft, is sufficient to effect the movement of the massive clutch operating elements, as hereinafter described.

The operation of my improved clutch operating mechanism is as follows:—With the parts in the positions indicated, the second lever 29, (having in effect four arms, 29', 29², 32, and 37) is locked against operative movement, due to the engagement of its extension 37 with the shoulder 38, and notwithstanding the fact that the spring 33 is under extreme compression. In this position of the parts the clutch elements have been disconnected, as shown, since the high part of face cam 31 has been carried against the cam roll 30, thus moving the collar 20 to the right. When the lever 43 is rocked, by a draft thereon which needs only to overcome the light spring 45, the initial movement of latch 46 raises the adjacent end of lever 39, and thus depresses the shoulder 38 of said lever enough to release the extension 37. The full force of compressed spring 33 is thereby made effective to rock the four arm lever 29, this action causing the withdrawal of cam roll 30 from engagement with the face cam 31, and permitting the collar 20, as above described, to be brought immediately under the influence of the cam roll 23, to cause the engaging movement of the clutch. A further movement of the lever 43 and latch 46 brings the trip arm 49 of said latch against the fixed stop 50, whereby said latch is rocked into an extreme position so as to be withdrawn from beneath the adjacent end of lever 39.

The clutching elements being thus brought into engagement, by the expansive force of spring 33, the shaft 1 is caused to rotate in unison with the gear 7, so as to operate the shear or other device which is connected to said shaft. This rotation of the shaft 1 continues while the raised portions of face cam 24 are coming into contact with the cam roll 23. As the higher portions of said cam 24 become progressively available, the lever 21 is progressively returned to its normal position, and through the clutch teeth 36, 36, the four-arm lever 29, is also being moved, so as to recompress the spring 33 on the rod 34, the clutching elements still remaining in engagement. Finally, when the highest portion of cam 24 is reached by the roll 23, the cam roll 30, now in operative position, is reached by the rising portion of cam 31, and thereupon the collar 20 is moved to the right, to disengage the clutching elements at the completion of a single revolution of the driven shaft 1. The return of the four-arm lever 29, to its normal position has in the meantime brought the extension 37 again behind the shoulder 38, the spring 42 permitting the necessary depression of lever 39 for this purpose, and thereafter insuring against the release of the lever 29, 32.

It will thus be seen that only a single revolution of the driven shaft 1 is possible, even though the operator should hold the lever 43 in its operative position indefinitely. It is not possible to obtain another revolution of the driven shaft until the lever 43 is first returned to its normal position, and then moved again, as above described, to allow the latch 46 to lift the lever 39. It will also be seen that the power required to move the heavy clutching elements into and out of engagement is furnished by the machine itself, and the only force necessary to be exerted by the operator is that required to overcome the light spring 45. The power to move the collar 20 is stored up at each revolution of the driven member in the spring 33, and this power is not available until the lever 43 is moved by the operator from normal illustrated position in the manner above described. With the construction shown, it is impossible to obtain more than one revolution of the driven member at one time, since the power of the machine is employed through the cam 31 to throw the clutch out of engagement after a single revolution has been completed. Obviously, by the provision of additional cams on the flange 25 of collar 20, any desired rotation of the driven member less than one revolution can be provided for, and obviously, such partial revolutions can not be repeated without returning the lever 39 to its normal illustrated position.

A most important feature of my invention is the relative arrangement of the driving and driven members of the clutch, whereby the clutching mechanism, and the operating devices therefor, are disposed exteriorly of the machine, so as to be easily removable for the purposes of replacement or repair without the necessity for dismounting or disturbing any other part of the machine. The mounting of the driving gear 7 on the quill 9 provides, in this connection, a construction which makes possible this exterior arrangement of the clutching instrumentalities, and at the same time prevents the exertion of any strains on the driven shaft 1, due either to the weight of the gear or to the pressure transmitted by the teeth thereof when power is being transmitted. Furthermore, it will be seen that after the disengagement of the clutch, there is no tendency for the rotating gear 7 to continue the rotation of the driven shaft by friction, since said gear rotates on the quill 9, and not on the shaft. It will also be apparent that while ostensibly the gear 7 is overhanging, with respect to the shaft, yet actually this is not the case, since the quill 9 provides a bearing for the shaft in the plane of said gear, and thus imparts to the machine all the advantages of a two-bearing shaft support, while at the same time allowing the exterior arrangement of the clutch which results from overhanging the gear beyond the fixed framework 11. The two-lever construction for moving the clutch collar eliminates the disadvantages of operation in the construction of Fuller and Carroll, by obviating the shock or blow on the collar that results from the clearance which must be provided for when a single lever is used. As a result, when the spring 33 is released, the roll 23 is already in contact with the flange 25, so that the clutch collar is gently started toward engaging position, with a consequent saving in the wear and tear on the machine.

I claim,

1. The combination with a pair of engageable clutch members, of a spring adapted to move said members into engagement, means operable by the rotation in unison of said members for moving them out of engagement and for compressing said spring, and means having a lost motion connection with said last mentioned means for transmitting the pressure of said spring to procure engagement of said members.

2. The combination with a pair of engageable clutch members, of a spring adapted to move said members into engagement, a lever operable by the rotation in unison of said members for compressing said spring, and a second lever having a predetermined movement independently of said first lever for transmitting the pressure of said spring to procure engagement of said members.

Dated this thirteenth day of June, 1918.

EDWARD J. QUINN.

Witnesses:
WILLARD A. WINN,
PAULINE W. B. BAKER.